D. M. COOK.
Process and Apparatus for Evaporating and Defecating Cane-Juice.
No. 8,341. Reissued July 23, 1878.
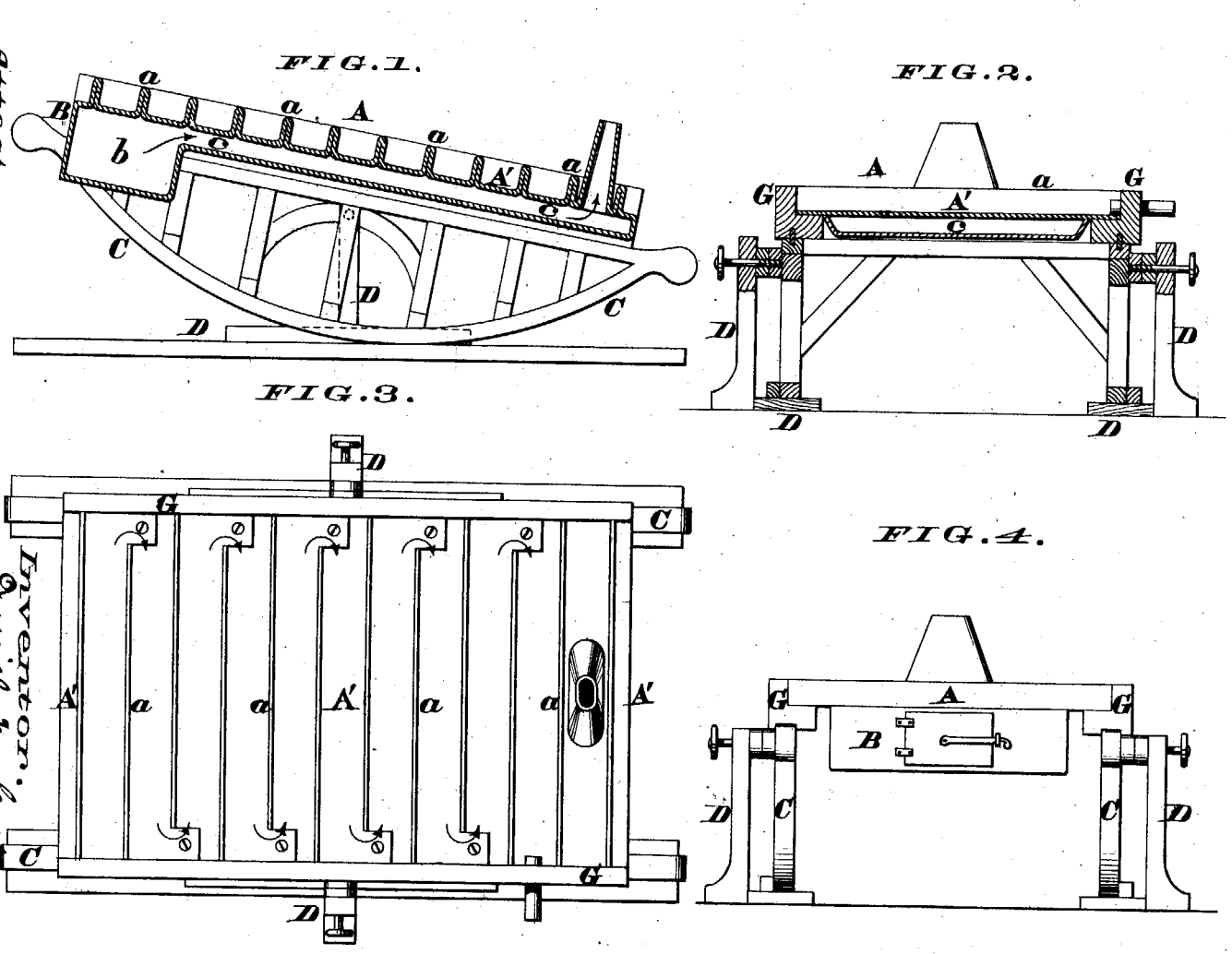
N. PETERS, PHOTO-LITHOGRAPHER, WASHINGTON, D. C.

UNITED STATES PATENT OFFICE.

DANIEL M. COOK, OF MANSFIELD, OHIO.

IMPROVEMENT IN PROCESSES AND APPARATUS FOR EVAPORATING AND DEFECATING CANE-JUICE.

Specification forming part of Letters Patent No. 20,631, dated June 22, 1858; Reissue No. 867, dated December 20, 1859; extended June 22, 1872; Reissue No. 8,341, dated July 23, 1878; application filed July 11, 1878.

*To all whom it may concern:*

Be it known that I, D. M. COOK, of Mansfield, in the county of Richland and State of Ohio, have invented a new and useful Improvement in Evaporating-Pans and Processes for Making Refined Sugars Direct from Sugar-Juices, of which the following is a specification:

Before the date of my invention there had been described in various publications different methods for clarifying and condensing sugar-juices, the most approved of which was a very complicated apparatus, in which the juice received in a raw state was first carefully purified by one process, using chemical agents as well as complicated appliances in its purification, and was then by another process evaporated in closed evaporators under heat, and then still further condensed by means of evaporating-plates, heated more or less by steam, and then finally brought to crystallization.

Such processes required very complicated appliances, and could only be used on large plantations.

I have sought to simplify the process of evaporating sugar-juices and produce a new process of making sugar, wherein the work of defecating the juice and condensing the sirup could be carried on at one and the same time, and that by means of simple appliances that can be brought within the reach of every farmer; and my invention consists both in the process of defecating and concentrating raw sugar-juices at the same operation, and in the mechanism for effecting this defecation and concentration.

The following is as full and clear a description of the same as I am able to give; and to assist in the description of the mechanism I refer to the accompanying drawings, forming a part of this specification, in which—

Figure 1 is a vertical longitudinal section of an evaporator containing my improvements. Fig. 2 is a transverse section of the same. Fig. 3 is a plan view of the same, and Fig. 4 an end view of the same.

Similar letters of reference in each of the several figures indicate corresponding parts.

In these drawings, A represents an evaporating-pan; B, a fire-furnace; C C, rockers; D D, a stationary frame. These parts, as shown in the drawings, are constructed substantially as follows: The bottom A′ and ends of the pan are made of sheet metal, and the sides G G of wood. Transversely to the pan, at proper distances apart, are arranged ledges or partitions *a a*, said ledges extending nearly across the pan. They strike out alternately from the sides of the pan, so that a zigzag or indirect channel or passage from front to tail end, for the current to circulate through, is formed, as represented in the drawings. The arrows indicate the direction of the circulating current. It is obvious that these ledges or partitions can be made of greater or less height, according as is desired.

The furnace B consists of a fire-box, *b*, of less width and of less length than the pan, and a flame-flue, *c*, preferably of the same width as the fire-box, but of less depth, extending from the rear of the fire-box to the tail end of the pan. This flame-flue communicates with a smoke passage or pipe.

It will be observed that the central portion of the bottom of the pan forms the top of the furnace, so that the flame in the fire-box and flame-flue comes directly in contact with the bottom of the pan. It will also be observed that both sides of the pan and a portion of its bottom, near each side, are isolated or kept from the contact of the heat from the furnace by reason of the furnace being of less width than the pan. This construction forms what I call "cooling-edges," projecting over the sides of the furnace, so that the liquid, in its course through the channel formed by the ledges in the pan, will pass alternately over the heated surfaces formed by the fire underneath the center of the pan, and then over the cool side formed by this extension of the side of the pan outside of and beyond the furnace, and that the liquid will thus continue to cross first over the heated central portion of the furnace, then over the cool surface of the side along the whole length of the pan, its course being made by means of these ledges at right angles to the draft of the furnace, so that it repeatedly crosses and recrosses the furnace-flame. The furnace and pan, by this mode of construction, are so brought together that they can both be transported as one from place to place.

As a medium for regulating the flow of the juice of this stream over the heating and cooling surfaces, I have shown rockers C C and frame-work D D, serving as a support or standard. The pan being mounted on these may have the front slightly depressed, so as to cause a momentary retarding of the flowing sirup at times when the stream is thin and the fire slight, or by elevating the front more or less the operator can insure a rapid flowing off of the sirup when the stream is thick and the fire or heat intense. This tilting of the pan may be attained by having the bottom of the frame serve as a fulcrum for the pan to vibrate on, or by having the vibrating apparatus, as a whole, attached to the frame by set-screws, which can be loosened so as to allow said apparatus to be inclined, as seen in Fig. 1, and then tightened so as to retain it in this inclined position; or the same result may be attained by any other equivalent means.

When this device is in use, the operator, having kindled a fire and supplied it with fuel through the door at the front of the furnace, as shown in Fig. 4, thereby creating a constant flame underneath the whole length of the pan at right angles to the channels made in the pan by means of the ledges, as shown in Fig. 1, allows the juice to enter in a continuous stream from a reservoir that may be placed so that the juice will come into the beginning of the channel nearest the front. The juice then flows along the first channel around the end of the ledge on the cool side, then along through the next channel across the heated center to the cool side of the pan at the end of the channel, and thus on to the end of the pan, continually crossing and recrossing the line of greatest heat, the operator regulating the rapidity of the flow, so that when the juice reaches the end of the channel farthest removed from the front it may have the desired concentration, the defecation having been effected during the progress through the pan.

The utility of my invention will be seen from the fact that the sirup is heated intensely at the center of the channel across the pan, then partially cooled as it flows to the cooling sides.

The rapid ebullition through the center of the pan causes the scum and feculent matter to be loosened and thrown up from the liquid, so that it rises when the liquid becomes cooler and more nearly stationary at the cooling sides of the pan, where it may be removed by skimmers, the transverse ledges and the rapid ebullition at the center of each succeeding channel serving to inclose the impurities on the surface of the stiller liquid at the side until the scum can be removed, thus preventing it being boiled over again into the sirup and thus serving to discolor it.

This frequent cleansing of the stream as it passes from channel to channel secures its perfect defecation during the process of concentration, and dispenses with the usual process of defecation by chemical agents prior to the concentration of the juice. It thus substitutes one simple mechanical appliance, that can be readily removed from place to place when desired, for the expensive and complicated methods that have been used, in which the sirup went through several different processes before crystallization was reached.

The utility of my invention will be further seen from the fact that it renders practicable the boiling of sugar-juices while in motion, so that a shallow flowing stream, instead of a deep still body of liquid is exposed to the fire. Having a shallow flowing stream pass over its heated surface effects a uniform boiling without scorching the juice, and enables the operator to know at a glance the condition of the sirup, and so time its flow by means of the regulating appliances that it shall reach the outlet of the pan as it arrives at the point of desired concentration, and thereby avoid the danger of subjecting it too long to the action of the heat, and thus prevent crystallization; also, because it allows the sirup to be kept a longer or shorter time in contact with the heating-surface, according as the stream is shallow or deep, or the fire intense or slight.

Having thus described my invention, what I regard as new, and desire to secure by Letters Patent, is—

1. The within-described process of defecating and concentrating raw sugar-juices by passing the same in a moving body through an open evaporating-pan exposed to the direct action of the fire, substantially as and for the purposes described.

2. An evaporating-pan furnished with transverse ledges, in combination with a fire-furnace, a portion of the bottom surface of the pan, near each side, being unexposed to the direct heat of the furnace, so that, while the intermediate surface of the bottom of the pan is intensely heated, the other portions remain comparatively cool, substantially as and for the purposes set forth.

3. In combination with an evaporating-pan for evaporating a moving body of liquid, means, substantially as described, for elevating or depressing either end of the pan to regulate the flow of the liquid through the same, as set forth.

4. An evaporating apparatus which allows of a circulation of the stream of sirup, boils it at the center of the pan, and cools it at the sides of the same, and affords facilities for regulating the flow of the stream, substantially as and for the purposes set forth.

5. The combination, in an evaporating-pan, of the sheet-metal bottom A′ and the wooden sides G G, substantially as and for the purposes described.

6. In combination with an open evaporating-pan having transverse ledges arranged across the line of draft of the frame of the furnace, and capable of receiving a greater or less inclination, for the purpose of regulating the flow of the juices through it, a furnace of less width than the pan, substantially as and for the purposes described.

DANIEL M. COOK.

Witnesses:
GEO. W. BLYMEYER,
QUEEN TILLA RODOCKER.